June 29, 1971  E. A. HAGLUND ET AL  3,588,923

PRESSURE TRANSFER VALVE

Filed Oct. 16, 1969  3 Sheets-Sheet 1

INVENTORS
ELMER A. HAGLUND
DONALD W. HOWELL
IVAN L. MARBURGER

BY
Christie, Parker & Hale
ATTORNEYS

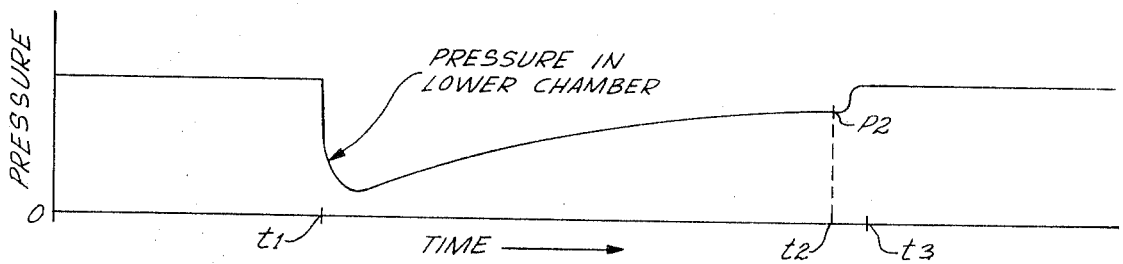
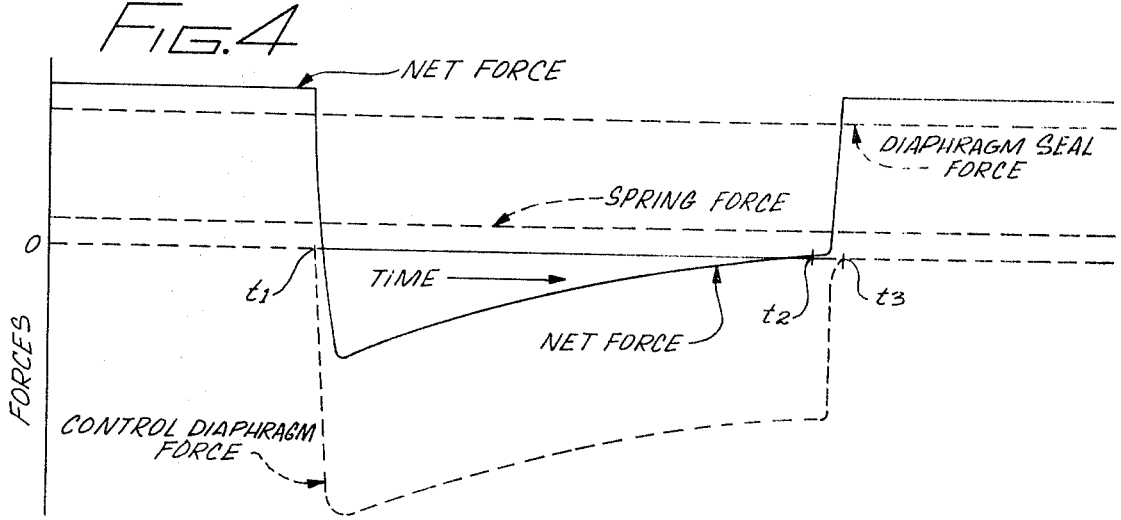
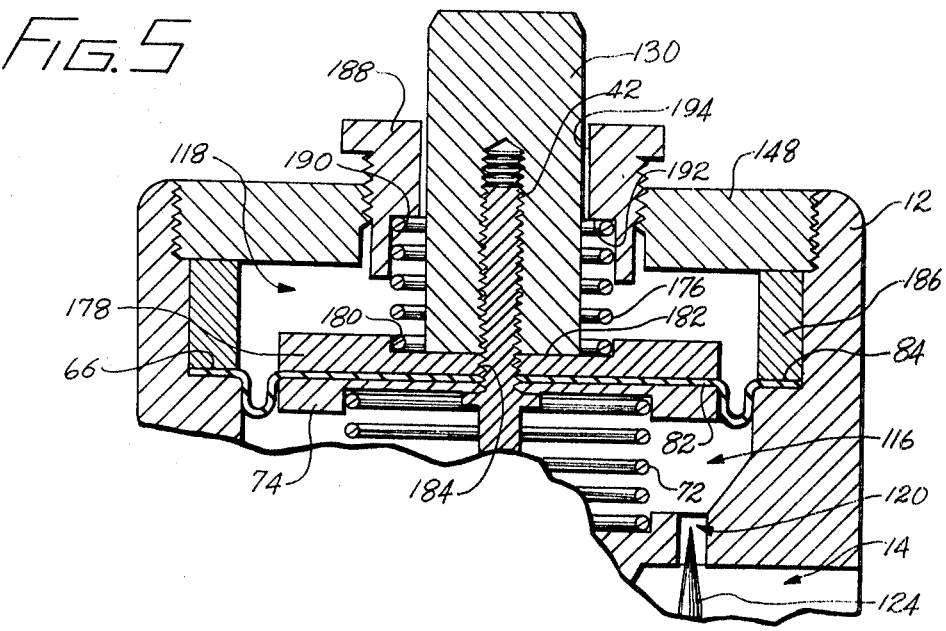

June 29, 1971 E. A. HAGLUND ET AL 3,588,923

PRESSURE TRANSFER VALVE

Filed Oct. 16, 1969 3 Sheets-Sheet 3

United States Patent Office 3,588,923
Patented June 29, 1971

3,588,923
PRESSURE TRANSFER VALVE
Elmer A. Haglund, 700 Poinsettia Ave., Del Mar, Calif. 92625; Ivan L. Marburger, 1315 Tulare Way, Upland, Calif. 91876; and Donald W. Howell, 1627 Victoria Place, La Verne, Calif. 91750
Filed Oct. 16, 1969, Ser. No. 867,043
Int. Cl. E03d *3/00;* G05d *7/00*
U.S. Cl. 4—26
20 Claims

ABSTRACT OF THE DISCLOSURE

A pressure transfer valve has a flexible pressure responsive diaphragm disposed between a lower pressure chamber and an upper pressure chamber. A valve inlet port connected to a source of fluid under pressure communicates with each pressure chamber, and a valve outlet port communicates with the lower pressure chamber through an upper valve seat. A manually operative movable plunger carried by the diaphragm is sealed at the upper valve seat so that both pressure chambers are initially subjected to inlet pressure. A valve vent port having a lower valve seat communicates with the outlet port. Movement of the plunger to the lower valve seat permits fluid under pressure to flow through the outlet port to a downstream system. When outlet pressure builds up to a predetermined value sensed by the diaphragm, the plunger automatically returns to its upper valve seat and the outlet pressure exhausts through the vent port. The downstream system can include a flush control pump connected to a toilet system.

BACKGROUND OF THE INVENTION

This invention relates to devices for controlling fluid flow, and more particularly to a fluid pressure transfer valve particularly useful as a control component in pneumatic or hydraulic circuitry.

In the past, a variety of valve structures have been used as control means for pressure fluid systems. Many of these systems are actuated, for example, by a pulse of fluid under pressure delivered by the valve. A need has developed for a fluid pressure transfer valve that is capable of (a) pressurizing a downstream system each time the valve is actuated, (b) automatically shutting off the pressure to the downstream system when downstream pressure builds up to a predetermined value, and (c) automatically returning to its initial position ready to be operated the next time it is desired to pressurize the downstream system.

SUMMARY OF THE INVENTION

Briefly, this invention provides a fluid pressure transfer valve capable of performing the above-described functions. The valve includes a casing having a hollow interior and control means within the hollow interior preferably in the form a diaphragm. The casing and the diaphragm define a control pressure chamber, the position of the diaphragm being responsive to fluid pressure in the control pressure chamber. The valve further includes means defining (a) a fluid inlet to the control pressure chamber, (b) a fluid outlet from the control pressure chamber adapted for fluid communication with a downstream system, and (c) a fluid vent from the outlet means. Valve means responsive to position changes of the control means both prevent fluid communication between the control pressure chamber and the outlet means and provide fluid communication between the outlet means and the vent means when pressure in the control pressure chamber is above a predetermined value. When pressure in the pressure chamber is below a predetermined value, the valve means both prevents fluid communication between the outlet means and the vent means and provides fluid communication between the pressure chamber and the outlet means. Biasing means determining the predetermined pressure value urge the control means and the valve means to prevent fluid communication between the control pressure chamber and the outlet means. Means are provided for overcoming the biasing means by acting on the control means to provide fluid communication between the control pressure chamber and the outlet means. Overcoming the biasing means permits fluid under pressure to flow from the inlet means, through the pressure chamber and the outlet means, and to the downstream system until fluid pressure in the pressure chamber reaches the predetermined value. At this point, the control means automatically returns the valve means to a position preventing fluid communication between the control pressure chamber and the outlet means. This provides fluid communication between the outlet means and the vent means so that pressure in the downstream system can exhaust through the vent means.

In the preferred form of the invention, the biasing means includes a diaphragm seal disposed within the hollow interior of the casing above the control pressure chamber to define a second pressure chamber sealed from the atmosphere. The second pressure chamber is exposed to inlet line pressure to exert an upward force on the diaphragm seal that urges the valve means to prevent fluid communication between the control pressure chamber and the outlet means. The biasing means further includes a compression spring disposed in the control pressure chamber for engagement with the control means to produce an upward force on the valve means. In an alternative form of the invention, the diaphragm seal can be eliminated and the second pressure chamber subjected to atmospheric pressure. The fluid pressure in the control pressure chamber thus exerts an upwad force on the control means and therefore the valve means.

The valve means preferably includes an upper O-ring seal that seals the valve means at an upper valve seat between the control pressure chamber and the outlet means. The valve means further includes a lower O-ring seal that seals the valve means at a lower valve seat between the outlet means and the vent means. Preferably, a manually operative actuator button connected to the valve means extends outwardly from the casing. Whenever it is desired to pressurize a downstream system, the actuator button is depressed to move the valve means from its upper valve seat to its lower valve seat. When the pressure in the downstream system causes pressure in the control pressure chamber to reach a predetermined value, the valve means automatically returns to its upper valve seat. Preferably, a limited clearance exists between the valve means and the interior of the vent means for controlling the pressure decay in the downstream system and the control pressure chamber during transfer of the valve means from its lower valve seat to its upper valve seat.

From the above description, it can be seen that the valve of this invention is adapted to be actuated, either manually or otherwise, whenever it is desired to pressurize a downstream system. When downstream pressure builds up to a predetermined value, the valve automatically vents the downstream system and returns to its closed position. The valve is then in readiness to be actuated the next time it is desired to pressurize the downstream system. The valve of this invention is particularly useful when incorporated for use in the flush mechanism of a toilet system. In this application, the inlet means are connected to a source of fluid under pressure, preferably air, and the outlet means are connected to a pressure-tight vessel in the form of a pump containing a supply of flushing fluid, preferably water. The source of flushing fluid is connected to a toilet bowl. In use, the system is actuated by overcoming the biasing means of the valve. This allows fluid from the pressure source to flow to the pump which causes flushing fluid to flow out of the pump to the toilet bowl. When fluid pressure in the control pressure chamber of the valve reaches a predetermined value, the valve automatically closes.

The valve of this invention also functions as a timing device. An adjustable needle valve regulates the rate of fluid flow between the inlet means and the control pressure chamber. As a result, the time required for the downstream pressure to build up and then shut off can be regulated. From the foregoing description it has been seen that the predetermined pressure at which the valve means transfers to its closed position can be regulated by adjusting the magnitude of the biasing force exerted on the valve means. This adjusts the pressure at which the valve means closes and also serves as an indirect means for regulating pressure transfer time.

BRIEF DESCRIPTION OF THE DRAWINGS

The features of specific embodiments of the best mode contemplated of carrying out the invention are illustrated in the drawings, in which:

FIG. 1 is a side elevational sectional view taken centrally through a preferred form of the valve of this invention;

FIG. 2 is a side elevational sectional view showing means for adjusting the pressure at which the valve transfers from its open position to its closed position;

FIG. 3 is a diagram illustrating the variation of fluid pressure in the first chamber during a typical operating cycle of the valve;

FIG. 4 is a diagram illustrating the variation of the net force acting on the plunger during a typical operating cycle of the valve;

FIG. 5 is an alternative embodiment of the valve shown in FIG. 1;

DETAILED DESCRIPTION OF THE SPECIFIC EMBODIMENTS

Figure 6:
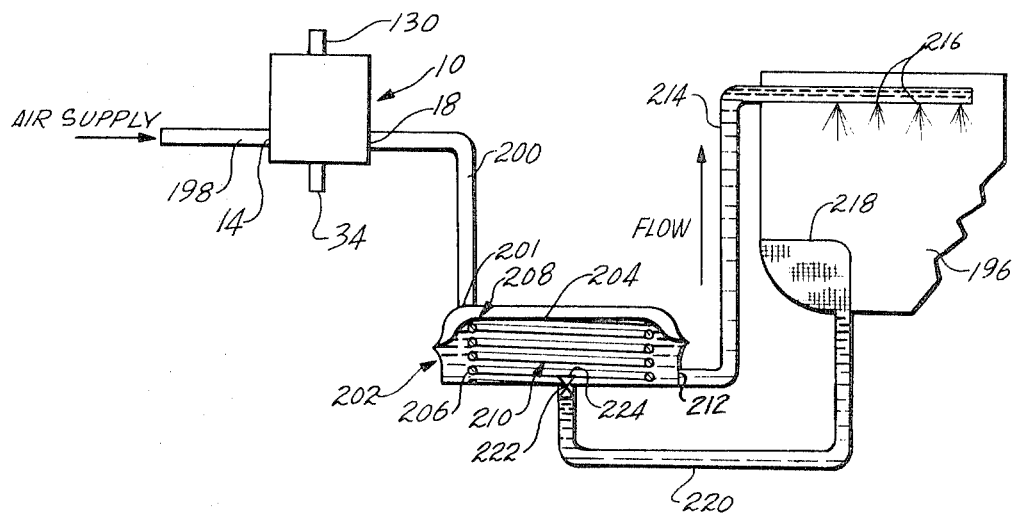
FIG. 6 is a schematic diagram showing the valve adapted for use in a pneumatic toilet system.

Referring to the drawings, a valve 10 is constructed from an upright transversely circular casing 12. An inlet port 14 extends horizontally into the lower right sidewall of casing 12. Inlet port 14 has an internally threaded outer portion 16 adapted for connection to an inlet line (not shown) leading to a source of fluid under pressure. An outlet port 18 extends horizontally into the lower left sidewall of casing 12. A relatively large-area vent port 20 extends upwardly into the bottom of casing 12 at its center. Outlet port 18 tapers to a hole 22 of reduced cross-sectional area extending into the side of vent port 20. Outlet port 18 has an internally threaded outer portion 24 adapted for connection to a line (not shown) leading to a downstream system pressurized by valve 10. Connected to vent port 20 is a vent tube 26 comprising a solid body defining an annular, externally threaded upper stub shaft 28 that screws into vent port 20. Stub shaft 28 extends upward from a laterally extending transversely hexagonal flange 30 for use in tightening vent tube 26 into vent port 20. An elongated, transversely circular lower stem 32 extends down from flange 30 concentric of an opening 34 formed through vent tube 26. Opening 34 tapers outward at the top of vent tube 26 to define a circular lower valve seat 36. A transversely circular passage 38 collinear with vent port 20 extends upward through the center of casing 12. The bottom of passage 38 tapers outward to define an upper valve seat 40.

Valve means in the form of an upright, vertically reciprocating plunger 42 extends upward through the center of casing 12. The plunger is assembled into valve 10 by extending it upward through vent port 20 and passage 38. Vent tube 26 then screws into the vent port. Plunger 42 includes an upwardly extending transversely circular stem 44 intermediate of which is a laterally extending transversely circular flange 46. The bottom of stem 44 tapers outwardly to a transversely circular valve spool 48 having an upper O-ring seal 50 and a lower O-ring seal 52. The portion of plunger stem 44 above flange 46 is externally threaded for a purpose hereinafter described. The lower portion of valve spool 48 below O-ring seal 52 defines a downwardly extending projection or plug 53 adapted to extend into the upper interior of opening 34 of vent tube 26. In use, when lower O-ring seal 52 is near or in contact with lower valve seat 36, a limited annular clearance exists between the outer periphery of plug 53 and the inner wall of opening 34.

A relatively large stepped bore 54 is formed in the upper part of casing 12 to define a hollow interior communicating with the top of passage 38. Bore 54 defines a transversely circular lower bearing surface 56 approximately intermediate of the casing opening into passage 38 at its center. A relatively shallow annular bore 58 extends vertically upward from bearing surface 56. Bore 58 opens into a larger sized upwardly extending bore 60 that tapers out to a vertically extending bore 62. Immediately above bore 62 is a larger sized vertically extending bore 64 that defines a laterally extending horizontal bearing surface 66 between bore 64 and bore 62. Above bore 64 at the top of casing 12 is a vertically extending internally threaded bore 68.

A coil spring 72 having approximately the same diameter as bore 58 is mounted on lower bearing surface 56 of stepped bore 54 so that it extends upwardly concentric of plunger stem 44. Coil spring 72 is compressed by a circular support disk 74 having a centrally disposed stepped bore extending upwardly from its underside to define a lower horizontal bearing surface 76 and a central aperture 78 for mounting the support disk on plunger 42. Lower bearing surface 76 of support disk 74 sits on the top of flange 46 of the plunger and bears against the top of coil spring 72.

Control means in the form of a relatively thin circular rubber control diaphragm 80 mounts on top of support disk 74 so that it extends horizontally outward from plunger stem 44. Diaphragm 80 has a downwardly extending, circular convolution concentric of its center disposed inwardly of its outer periphery to define an outer lip 84. Convolution 82 of diaphragm 80 fits around the outer edge of support disk 74 and its outer lip 84 mounts on bearing surface 66 of casing 12. Thus, convolution 82 extends downward into an annular space defined by the outer edge of support disk 74 and the vertical surface of bore 62. A flat circular disk 86 having approximately the same diameter as support disk 74 sits on top of diaphragm 80 and is secured thereto by a circular internally threaded nut 88 that screws down on the threaded portion of plunger stem 44.

A relatively thin circular rubber second diaphrgam or diaphragm seal 90 mounts on top of nut 88. Diaphragm seal 90 has the same configuration as control diaphragm 80 but is substantially smaller in size. The diaphragm seal has an upwardly extending circular convolution 92 concentric of its center and disposed inwardly of its outer periphery to define an outer lip 94. A circular washer 96 sits on top of diaphragm seal 90 inwardly of convolution 92. An annular seal disk 98 having a relatively large central aperture 100 mounts over plunger stem 44. Seal disk 98 has a relatively large and shallow lower bore 102 defining a downwardly projecting outer rim 104. A relatively shallow upper bore 106 in the upper surface of seal disk 98 defines an upwardly projecting outer rim 108 encompassing a horizontal upper bearing surface 109. Seal disk 98 has an O-ring seal 110 encompassing its outer periphery to seal it to the vertical wall of bore 64. Outer rim 104 of seal disk 98 mounts an outer lip 84 of control diaphragm 80 to seal the control diaphragm to bearing surface 66 of casing 12. The seal disk also provides a support and seal platform for outer lip 94 of diaphragm seal 90. The outer periphery of rim 104 of seal disk 98 is slightly reduced in cross-sectional area at its bottom to define an annular space 112 encompassing the outer edge of the seal disk. A horizontal inlet passage 114 extends through outer rim 104 of the seal disk from annular space 112.

Control diaphragm 80 defines the upper horizontal boundary of an annular lower chamber or first chamber 116 disposed centrally in casing 12. The bottom of seal disk 98 and diaphragm seal 90 cooperates with control diaphragm 80 to define an upper annular chamber 118 above lower chamber 116. The lower chamber communicates with inlet port 14 through a restricted flow passage 120 extending upward from the top of inlet port 14 to the bottom right side of the lower chamber. Upper chamber 118 communicates with inlet port 14 through a passage 122 extending diagonally upward from the top of inlet port 14. The top of passage 122 opens into annular space 112 which in turn communicates with upper chamber 118 through horizontal passage 114 in seal disk 98. A vertically extending needle valve 124, the upper portion of which is tapered to a point, has an externally threaded lower portion that screws up and down in an internally threaded bore 126 in the bottom of casing 12. Bore 126 is concentric of passage 120 so that needle valve 124 screws up and down along the centerline of passage 120. As internally threaded locknut 128 screws onto the lower portion of the needle valve and tightens against the bottom surface of casing 12.

An elongated, transversely circular actuator button 130 has an internally threaded central bore 132 extending upward through its bottom for screwing the actuator button onto the externally threaded upper portion of plunger stem 44. Actuator button 130 provides an axial load through washer 96 for sealing the inner central portion of diaphragm seal 90. A transversely circular collar 134 encompasses actuator button 130 and comprises a solid body defining a bottom outer lip 136 with a lower bearing surface. An upright stub sleeve 140 extends above outer lip 136, and an elongated sleeve section 142 of reduced cross-sectional area extends upward from stub sleeve 140. A stepped bore extending through collar 134 defines a relatively shallow lower bore 144 concentric of flange 136 and an elongated central bore 146 of reduced cross-sectional area above bore 144 extending upward through the remainder of collar 134. Bore 146 makes a snug fit around actuator button 130, and the bearing surface of bottom lip 136 screws down on top of outer lip 94 of diaphragm seal 90 to seal the diaphragm seal to upper bearing surface 109 of seal disk 98.

A transversely circular coverplate 148 having an externally threaded outer periphery 150 screws into the internally threaded upper bore 68 in casing 12. Coverplate 148 has a central bore 152 encompassing the outer periphery of stub sleeve 140 of collar 134 and a downwardly projecting circular lip 154 that spans its central bore 152. The bottom of lip 154 sits on the top of lower flange 136 of collar 134. Coverplate 148 not only functions as a cover for valve 10 but also provides an axial seal load for sealing both outer lip 94 of diaphragm seal 90 and outer lip 84 of control diaphragm 80 from the atmosphere. This load is transmitted through inner lip 154 of the coverplate, outer bottom flange 136 of collar 134, outer lip 94 of diaphragm seal 90 into upper bearing surface 109 of seal disk 98, outer rim 104 of seal disk 98 into outer lip 84 of control diaphragm 80, and into casing 12 through bearing surface 66. A pair of holes 158 extend upward through coverplate 148 to provide means for gripping the coverplate when it screws into the top of casing 12. The outer surface of sleeve section 142 of collar 134 is externally threaded for engagement with an internally threaded mounting nut 160 for use in mounting valve 10.

In use, valve 10 typically serves as a control component for a pneumatic or hydraulic circuit connected downstream of the valve. In the usual application, the downstream system is actuated by fluid under pressure delivered by the valve. For example, the valve can be used as a flush control on a pneumatic toilet, or in other applications where it is desired to pulse a valve from a remote location. In describing the operation of valve 10, it is assumed for the purposes of illustration that outlet port 18 connects to a line (not shown) leading to a downstream system pressurized by the valve. The downstream system can be an open system, or a closed system such as a pressure-tight vessel, for example. Inlet port 14 connects to an inlet line (not shown) for delivering fluid under pressure to valve 10. Preferably, inlet line pressure is greater than atmospheric pressure.

Before valve 10 is actuated at time $t_1$ (see FIGS. 3 and 4) to pressurize the downstream system, the pressure in chambers 116 and 118 is equal since both chambers are connected to inlet line pressure through inlet port 14. That is, lower chamber 116 connects to inlet port 14 through passage 120, and upper chamber 118 connects to inlet port 14 through passage 122 and passage 114. As seen best in FIG. 4, the forces acting on plunger 42 before time $t_1$ are: (1) an upward spring force produced by coil spring 72 which is essentially constant throughout the operational sequence of the valve, (2) a substantially constant net upward force produced on diaphragm seal 90 as a result of the pressure in upper chamber 118 (inlet line pressure) being greater than the pressure on the top of the diaphragm seal (atmospheric pressure), and (3) zero force on control diaphragm 80 since chamber 116 and 118 on both sides of the control diaphragm are subjected to the same pressure, i.e., inlet line pressure. The net force acting on plunger 42 before time $t_1$ is the sum of the above forces and is shown as the solid line in FIG. 4. The net upward force on plunger 42 keeps upper O-ring seal 50 of the plunger sealed in a closed position at valve seat 40 to block passage 38. Thus, the line (not shown) to the downstream system is vented to the atmosphere through outlet port 18 and vent tube opening 34.

At a time $t_1$, when it is desired to pressurize the downstream system, actuator button 130 is depressed with a force sufficient to overcome the net upward force acting on plunger 42 prior to time $t_1$. Preferably, actuator button 130 is depressed manually, but, the valve of this invention can be adapted to be electrically, mechanically, pneumatically or otherwise actuated without departing from its basic mode of operation. When actuator button 130 is depressed, plunger 42 leaves upper valve seat 40 and opens passage 38. This causes the pressure in lower chamber 116 to rapidly decrease as illustrated in FIG. 3. This pressure drop causes the net force on control diaphragm 80 to go rapidly from zero to a large net downward force, since line pressure acting above the control diaphragm is constant and the bottom side of the diaphragm is now essentially vented. This downward force on control diaphragm 80 is substantially greater than the upward forces produced by coil spring 72 and diaphragm seal 90. As a result, a net downward force is exerted on plunger 42, as shown in FIG. 4. This net downward force causes the plunger to move downward to an open position at valve seat 36 where it is sealed by lower O-ring seal 52. The transfer of plunger 42 to its open position is nearly instantaneous from the time actuator button 130 is depressed.

The instant actuator button 130 is depressed and plunger 42 leaves upper valve seat 40, fluid starts to flow from inlet port 14 upward through passage 120, through lower chamber 116, down through passage 38, and out outlet port 18. As fluid continues to flow the outlet pressure, and therefore the pressure in lower chamber 116, continues to rise, as shown in FIG. 3. As the outlet pressure rises the force on control diaphragm 80 becomes less negative and therefore the net downward force on plunger 42 continues to decrease. When the net force on the plunger reaches zero at time $t_2$, the plunger is ready to automatically return to its closed position at valve seat 40.

At this time, the outlet pressure, and therefore the pressure in lower chamber 116, has a magnitude $P_2$ as illustrated in FIG. 3. Following time $t_2$, the downward force on control diaphragm 80 continues to decrease and as a result, the net force on plunger 42 becomes a slightly positive upward acting force that starts the plunger to move upward. Even though the seal at lower valve seat 36 is now broken, the pressure in the downstream system and lower chamber 116 does not rapidly decay because there is a limited clearance between the outer diameter of the bottom of plunger spool 48 and the inside diameter of vent port 34. This clearance, or small annular space, prevents the pressure from rapidly decaying until plunger 42 is well on its way to returning to upper valve seat 40. When plunger 42 reaches its closed position at time $t_3$, the downstream system vents through opening 34 in vent tube 26. The vent area provided by opening 34 is very large so that the downstream system vents rapidly.

As seen from the above description, acuator button 130 is depressed at time $t_1$, downstream pressure then builds up from atmospheric pressure to a pressure $P_2$ at time $t_2$, and valve 10 then automatically shuts off at time $t_2$ and returns to its closed position at time $t_3$. A closed downstream system has been used as an example for the purposes of explanation. However, valve 10 can also be used in open downstream systems, and in any other application where it is desired to sense pressure build up and then transfer the system.

The valve pressure and force profiles of FIGS. 3 and 4 illustrates that the valve of this invention can be modified in various ways to adjust the lower chamber pressure $P_2$ (or the differential pressure across control diphragm 80) at which plunger 42 transfers back to its closed position. For example, increasing the upward spring force of coil spring 72 increases the net upward force acting on plunger 42 throughout the operational sequence of valve 10. Thus, the net force on the plunger reaches zero at an earlier time $t_2$, and this lowers the pressure $P_2$ at which the plunger transfers to its closed position.

FIG. 2 shows an alternative embodiment of this invention adapted to easily adjust the magnitude of pressure $P_2$. In this form of the invention, an actuator button 162 screws onto the top of plunger 42. An outwardly extending circular lip 164 encircles the bottom portion of actuator button 162. An upright collar 166 having a centrally disposed aperture 168 encompasses actuator button 162 and sits on top of diaphragm seal 90. In this view, diaphragm seal 90 is shown in the alternative form as a flat member without convolution 92. The outer periphery of lip 164 abuts against the inner wall of aperture 168 to define an annular space 170 above the upper surface of lip 164. An upwardly extending coil spring 172 mounts on top of lip 164 so that it encompasses actuator button 162 in annular space 170. An adjustable sleeve 174 with a central aperture 175 adapted to be fitted around actuator button 162 has an externally threaded outer surface engageable with an internally threaded upper portion of aperture 168 of collar 166. Sleeve 174 abuts against the top of coil spring 172 and screws up and down in annular space 170 to adjust the tension in springs 172.

In use, tightening of sleeve 174 increases the tension in coil spring 172 to increase the downward loading force on plunger 42. This lowers the net force acting on the plunger during the operational sequence of the valve, and thereby adjusts the time $t_2$ at which the net force on the plunger reaches zero. As a result, the pressure $P_2$ (or the differential pressure across control diaphragm 80) at which the plunger returns to its closed position is adjusted.

FIG. 5 shows an alternative form of the valve of FIG. 1 modified by eliminating diaphragm seal 90 and replacing it with an upright coil spring 176 disposed in upper chamber 118. In this form of the invention, circular disk 86 of FIG. 1 is replaced by a circular support disk 178 having a stepped bore defining a relatively shallow large central aperture 180 defining an upper bearing surface 182 and a central aperture 184 extending from the upper bearing surface through the support disk. Actuator button 130 screws onto plunger 42 with its lower surface abutting against bearing surface 182 of support disk 178. Coil spring 176 then mounts on bearing surface 182 of support disk 178 to encompass the outer periphery of actuator button 130. Outer lip 84 of control diaphragm 80 is sealed to bearing surface 66 of casing 12 by an annular spacer 186 that mounts on top of lip 66. Coverplate 148 then screws into the top of casing 12 and tightens down on the top of spacer 186 to seal the outer lip 84 of control diaphragm 80. In this form of the invention, coverplate 148 has an internally threaded central aperture adapted for engagement with an externally threaded outer surface of an adjustable sleeve 188 encompassing actuator button 130 above coil spring 176. Sleeve 188 has a centrally disposed stepped bore comprising a relatively large lower bore 190 defining a lower horizontally bearing surface and an upper bore 194 of reduced cross-section fitted around the outer periphery of actuator button 130. The top of coil spring 176 bears against lower bearing surface 192 of sleeve 188 and the sleeve screws up and down to adjust the tension in spring 176.

In use, inlet port 14 of the valve of FIG. 5 connects to an inlet line (not shown) leading to a source of fluid under pressure. In this form of the invention, passage 122 of FIG. 1 is eliminated so that upper chamber 118 is not subjected to line pressure. Instead, upper chamber 118 commucniates with the atmosphere through the annular space between aperture 194 of sleeve 188 and the outer periphery of actuator button 130. Since lower chamber 116 is subjected to line pressure, which is greater than atmospheric pressure, a constant net upward force on the button of control diaphragm 80 exists prior to time $t_1$. This upward force on control diaphragm 80, combined with the upward spring force of coil spring 72, is greater than the downward force produced by coil spring 176. This produces a net upward force on plunger 42 that compresses coil spring 176 and keeps the plunger in its closed position sealed to upper valve seat 40 (see FIG. 1). When actuator button 130 is depressed at time $t_1$, the pressure in lower chamber 116 rapidly decreases. The force on control diaphragm 80 goes rapidly from a net upward force to a net downward force and causes the net force on plunger 42 to act downward and therefore transfer the plunger to its open position sealed at lower valve seat 36 (see FIG. 1). When the plunger is in its open position, forces exerted by the coil spring 176 are sufficient to hold the plunger open as the downstream system is pressurized. While plunger 42 is open, fluid under pressure continues to flow from inlet port 14 through lower chamber 116 and out outlet port 18 to pressurize the downstream system. As downstream pressure builds up, the net force on plunger 42 eventually reaches zero at time $t_2$, after which time the plunger automatically transfers back to its closed position.

From the above description it is apparent that valve 10 of this invention also functions as a timer valve by delivering pressure to a downstream system for a predetermined time interval. It has been seen that the various means for adjusting the interval from time $t_1$ to time $t_2$ include: (1) the adjustability of the tension in coil spring 72, (2) the adjustability of the magnitude of the inlet line pressure, (3) the adjustability of the tension in coil spring 172 in the embodiment of FIG. 2, (4) the adjustability of the tension in coil spring 176 in the embodiment of FIG. 5. The preferred means for adjusting valve transfer time is provided by needle valve 124 of FIG. 1. Adjustment of the needle valve changes the effective area of passage 120 and thereby adjusts the rate of fluid flow through lower chamber 116. This changes the time for a given downstream system to build up to pressure $P_2$. Locknut 128 locks the adjustment of needle valve 126.

The valve of this invention is particularly useful as a control device for pressurizing a downstream system and then automatically shutting off the pressure to the system and returning to a closed position where it is ready to be operated the next time it is desired to pressurize the downstream system. This particular use of the valve is illustrated in FIGS. 6 and 7 which show valve 10 adapted for connection to a downstream system in the form of various embodiments of a flush mechanism for a toilet bowl 196.

The system shown in FIG. 6 includes a pipe 198 leading from a pressure regulated air supply to valve inlet port 14. An outlet pipe 200 leads from valve outlet port 18 to an air inlet 201 to a diaphragm pump 202. The diaphragm pump is a pressure-tight vessel including a horizontally disposed diaphragm 204 supported by a coil spring 206. Diaphragm 204 defines on its top side a pressure chamber 208 in fluid communication with valve outlet port 18 through air inlet 201 and on its bottom side a lower chamber 210 filled with a flushing fluid such as water. An outlet port 212 at the bottom of lower chamber 210 connects to a pipe 214 leading to the top of toilet bowl 196 where the pipe 214 has a plurality of spray nozzles 216. Toilet bowl 196 includes a filter 218 connected to a return pipe 220 leading to an inlet port 222 at the bottom of lower chamber 210. Inlet port 222 is controlled by a check valve 224.

During use of the system shown in FIG. 6, valve 10 is normally closed so that the valve inlet port 14 is sealed from valve outlet port 18. In this normal position, vent port 34 is in fluid communication with outlet port 18. Vent port 34 is preferably exposed to the atmosphere so that pressure chamber 208 of diaphragm pump 202 is normally at atmospheric pressure as a result of its connection to valve outlet port 18 through outlet pipe 200. When valve actuator button 130 is depressed, the seal between the valve inlet port and valve outlet port is broken and air flows from the valve to pressure chamber 208 of the diaphragm pump. This pressurizes the pump and causes the flushing fluid in lower chamber 210 to flow through spray nozzles 216 into toilet bowl 196 to provide flushing action. When diaphragm 204 of the diaphragm pump reaches the end of its stroke, air continues to flow into pressure chamber 208 of the pump causing the pressure in the chamber to build up until the valve transfer pressure point is reached. The difference between the diaphragm pump's operating pressure and the valve's transfer pressure is small and therefore this action is very rapid. The valve then transfers to its closed position and the air in pressure chamber 208 exhausts to the atmosphere through valve vent port 34. Diaphragm 204 is forced back to its normal position by spring 206 and flushing fluid is sucked into lower chamber 210 from filter 218 through check valve 224 thereby loading the diaphragm pump for the next flush cycle.

Figure 7:
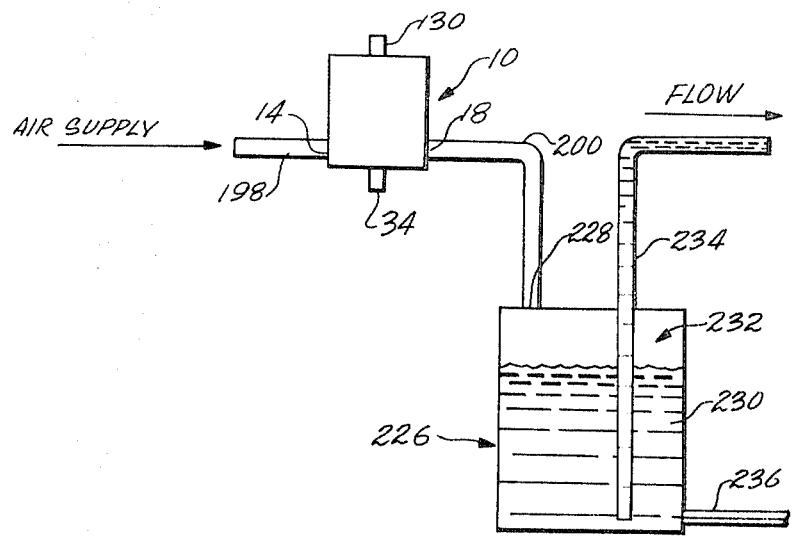
FIG. 7 is a schematic diagram showing an alternative embodiment of the toilet system of FIG. 6.

FIG. 7 shows an alternative arrangement of the system of FIG. 6 wherein diaphragm pump 202 is replaced by a sump tank 226. The sump tank is a closed pressure-tight vessel having an inlet 228 connected to outlet pipe 200 from valve 10. The sump tank contains a supply of flushing liquid 230, the upper level of which defines with the interior of the tank an air chamber 232 above the liquid. An upright draw-off pipe 234 leads from the sump tank to a toilet bowl (not shown) and a return pipe 236 leads from a toilet bowl filter (not shown) to the bottom of the sump tank.

In use, operation of the system shown in FIG. 7 is substantially the same as that described for the system shown in FIG. 6. When valve actuator button 130 is depressed, air flows into sump tank 226 causing pressure in air chamber 232 to build up. Flushing fluid 230 flows out of the sump tank through draw-off pipe 234 which delivers the fluid to a toilet bowl (not shown) for flushing action. Air continues to flow into air chamber 232 until pressure in the chamber builds up to the design transfer pressure point of valve 10, whereupon the valve closes and exhausts the air pressure in chamber 232 through vent port 34. Flushing fluid 230 then flows back into the sump tank through return pipe 236.

We claim:
1. A fluid pressure transfer device comprising:
 (a) a casing having a hollow interior;
 (b) control means within the hollow interior to define therewith a pressure chamber and for position response to fluid pressure in the pressure chamber;
 (c) means defining a fluid inlet to the pressure chamber;
 (d) means defining a fluid outlet from the pressure chamber adapted for fluid communication with a downstream system;
 (e) means defining a fluid vent from the outlet means;
 (f) valve means responsive to position changes of the control means for (1) both preventing fluid communication between the pressure chamber and the outlet means and providing fluid communication between the outlet means and the vent means when fluid pressure in the pressure chamber is above a predetermined value, and (2) both providing fluid communication between the pressure chamber and the outlet means and preventing fluid communication between the outlet means and vent means at pressures below the predetermined value;
 (g) biasing means urging the control means and the valve means to prevent fluid communication between the pressure chamber and the outlet means, the biasing means determining said predetermined pressure value; and
 (h) means for overcoming the biasing means by acting on the control means to move the valve means to provide fluid communication between the pressure chamber and the outlet means, whereby fluid under pressure flows from the inlet means through the pressure chamber and the outlet means to the downstream system until pressure in the pressure chamber reaches the predetermined value, whereupon the control means automatically moves the valve means to prevent fluid communication between the pressure chamber and the outlet means and to provide fluid communication between outlet means and the vent means.

2. Apparatus according to claim 1 wherein the downstream system comprises a pressure-tight vessel; and further including means for connecting the inlet means to a source of fluid under pressure, and means for connecting the outlet means to the pressure-tight vessel, whereby overcoming the biasing means allows fluid under pressure from the pressure source to flow to the pressure-tight vessel.

3. Apparatus according to claim 2 wherein the pressure-tight vessel contains a source of flushing fluid; and further including a toilet bowl, and means for connecting the source of flushing fluid to the toilet bowl, whereby the flow of fluid under pressure from the pressure source causes the flushing fluid to flow from the pressure-tight vessel to the toilet bowl until fluid pressure in the pressure chamber reaches the predetermined value.

4. A pressure transfer valve with automatic return means comprising:
 (a) a casing having a hollow interior;
 (b) a control diaphragm within the hollow interior to define with the casing a control pressure chamber, the control diaphragm being movable in response to pressure changes in the control pressure chamber;
 (c) inlet means in communication with the control pressure chamber;
 (d) outlet means in selective communication with the control pressure chamber;
 (e) vent means in selective communication with the outlet means;
 (f) plunger means responsive to movement of the control diaphragm for movement between a closed and an open position, the plunger means in its closed position preventing fluid communication between the control pressure chamber on the one hand and the outlet means and the vent means on the other hand, the plunger means in its open position preventing fluid communication between the vent means and the outlet means and communicating the control pressure chamber with the outlet means;

(g) means for producing a retaining force to normally retain the plunger means in its closed position; and (h) means for selectively overcoming the retaining force to move the plunger means from its closed position to its open position;

whereby when the inlet means is in communication with a fluid under pressure and when the outlet means is in communication with a closed system at a lower pressure than the inlet means, overcoming the retaining force to move the plunger means to its open position creates a flow condition and a reduced pressure in the control pressure chamber that maintains the plunger means in its open position so that the fluid under pressure from the inlet means flows through the control pressure chamber and the outlet means to the closed system until the pressure in the control pressure chamber builds up to a predetermined magnitude whereupon the retaining force is no longer overcome and the plunger means automatically returns to its closed position and exhausts the pressure in the closed system through the vent means.

5. Apparatus according to claim 4 wherein the means for overcoming the retaining force comprises a manually operative push button connected to the plunger means and extending exteriorly of the casing.

6. Apparatus according to claim 4 wherein the inlet means communicates with the pressure chamber via a restricted flow passage.

7. Apparatus according to claim 4 wherein the means for producing the retaining force includes first biasing means disposed between the casing and the bottom of the control diaphragm.

8. Apparatus according to claim 4 wherein the means for producing the retaining force includes a diaphragm seal disposed within the hollow interior to define with the casing and the top of the control diaphragm a second pressure chamber sealed from the atmosphere, the second pressure chamber being in fluid communication with the inlet means.

9. Apparatus according to claim 4 wherein the means for producing the retaining force includes a second pressure chamber defined by the casing and the top of the control diaphragm, the second pressure chamber being adapted for communication with a fluid under lower pressure than the fluid in the control pressure chamber, and second biasing means disposed between the casing and the top of the control diaphragm.

10. Apparatus according to claim 9 wherein the casing includes an adjustable collar engaging the second biasing means operative to adjust the retaining force.

11. Apparatus according to claim 9 wherein the second pressure chamber is exposed to atmospheric pressure.

12. Apparatus according to claim 4 wherein the means for producing the retaining force includes an adjustable collar between the casing and the plunger means, and third biasing means disposed between the adjustable collar and the plunger means.

13. Apparatus according to claim 4 including means for adjusting the rate of fluid flow communication between the inlet means and the control pressure chamber to thereby control the time interval between the movement of the plunger means from its closed position and its return to its closed position.

14. Apparatus according to claim 13 wherein the flow rate adjusting means comprises a needle valve adapted to adjustably restrict fluid flow between the inlet means and the control pressure chamber.

15. Apparatus according to claim 4 including a first valve seat between the control pressure chamber and the outlet means and first seal means adapted to make a leakproof seal at the first valve seat when the plunger means is in its closed position.

16. Apparatus according to claim 4 including a second valve seat between the outlet means and the vent means and second seal means adapted to make a leakproof seal at the second valve seat when the plunger means is in its open position.

17. Apparatus according to claim 4 including a downwardly extending projection integral with the plunger means defining a limited clearance between the plunger means and the vent means for controlling the pressure decay in the closed system and the control pressure chamber during transfer of the plunger means from its open position to its closed position.

18. In a fluid pressure transfer valve having a casing, a pressure chamber in the casing, an inlet to the pressure chamber and an outlet from the pressure chamber in fluid communication with a downstream system, means for delivering fluid under pressure from the valve pressure chamber to the downstream system and for automatically closing the valve after a predetermined pressure is attained, said means comprising:

(a) a vent in fluid communication with the outlet;

(b) valve means operative between a closed position for preventing fluid communication between the pressure chamber and the outlet when pressure in the pressure chamber is above a predetermined value and an open position for selectively permitting fluid communication between the pressure chamber and the outlet when pressure in the pressure chamber is below a predetermined value and for selectively preventing fluid communication between the outlet and the vent when the pressure in the pressure chamber is below the predetermined value; and (c) means for moving the valve means from its closed position to its open position, whereby movement of the valve means to its open position causes fluid under pressure to flow from the inlet through the pressure chamber and the outlet to the downstream system until pressure in the downstream system reaches a predetermined value whereupon the valve means automatically moves from its open position to its closed position and relieves the pressure in the downstream system through the vent.

19. Apparatus according to claim 18 including fluid flow restriction means between the valve means and the vent movable with respect to the vent for controlling the pressure decay in the downstream system and the pressure chamber during transfer of the valve means from its open position to its closed position.

20. Apparatus according to claim 19 wherein the fluid restriction means comprises a downwardly projecting plug carried by the valve means defining a limited clearance between its outer periphery and the interior of the vent.

References Cited

UNITED STATES PATENTS

| | | | |
|---|---|---|---|
| 2,735,441 | 2/1956 | Regna | 137—102 |
| 2,893,381 | 7/1959 | Black | 137—102 |
| 2,923,576 | 2/1960 | Seale | 137—102X |
| 3,175,572 | 3/1965 | Kauer et al. | 137—204 |

FOREIGN PATENTS

| | | | |
|---|---|---|---|
| 833,901 | 8/1938 | France | 137—102 |
| 1,320,554 | 1/1963 | France | 137—102 |

LAVERNE D. GEIGER, Primary Examiner

D. J. ZOBKIW, Assistant Examiner

U.S. Cl. X.R.

137—102; 251—52